3,057,732
FOOD PRODUCT AND PROCESS
James E. Conrad and Ray W. Kueneman, Caldwell, Idaho, assignors to J. R. Simplot Company, Boise, Idaho, a corporation of Nevada
No Drawing. Filed Jan. 18, 1960, Ser. No. 2,860
2 Claims. (Cl. 99—92)

This invention relates to a novel frozen food product and process for preparing it, in particular to a frozen mashed potato product in a synthetic, edible container which may be rapidly prepared for consumption, as by merely baking in a home oven.

It is well known to serve precooked mashed potatoes, with or without milk, butter, and seasoning, in a hollow baked potato skin. However, potatoes, because of their naturally occurring unsymmetrical shape and varying size, are not suitable to be opened and hollowed out by machine. Labor costs for mass-preparing such an item by hand are somewhat prohibitive.

Past attempts to overcome the labor costs involved in hand preparation comprise filling synthetic non-edible potato skins with prepared mashed potatoes. These synthetic potato skins have been made of a variety of non-edible materials, such as metallic foils, including aluminum foil, paper, and ceramics. Metal foil shells frequently impart an actual or imagined metallic taste to the potato. Paper containers, upon absorbing some water from the potato, tend to become soggy, disintegrate, and stick to the diner's fork. Because of initial cost, ceramic containers are usually non-disposable and therefore require washing. The costs of breakage must also be considered when non-disposable containers are used.

One object of this invention is to provide a low cost frozen mashed potato product in a synthesized, edible shell, which may be readily prepared for consumption.

Another object of this invention is to provide an edible pastry shell, suitable for filling with a prepared mashed potato, which will simulate a baked potato skin both as to physical appearance and texture.

Another object of this invention is to provide a completely edible, frozen food product which may be stored at temperatures below 0° F. for an indefinite period of time.

A still further object of this invention is the provision of processes for making the said edible shell, filling it and preserving the filled article.

The foregoing, and other objects, are achieved by the present invention, which broadly comprises one or more of the following products and process steps. First a batter, which comprises pastry flour and baking soda in a weight ratio of from about 160 to 1 to about 240 to 1, is formulated and the consistency of the batter is adjusted to allow molding and baking. Second, the batter is molded and cooked in a heated shaping mold to produce an edible pastry shell with the desired texture and color, and with a moisture content of between about 2% and about 15%. Third, a suitable amount of cooked mashed potato formulation is added to, at least, partially fill the cavity of said shell, said mashed potato formulation having an average moisture content of between about 73% and about 82%. The shell, prepared by the three steps described above, may be sold separately as an article of commerce, or may be further processed as described below. Fourth, prior to freezing and before or after filling the shell with the mashed potato formulation, the average moisture content of the shell is adjusted in any convenient manner, to a level such that at the instant the moisture in the shell is frozen said shell will have an average moisture content of from about 20% to about 40% by weight. Fifth, the filled pastry shell is then rapidly frozen to give a frozen food product, with the shell, per se, containing between 20% to 40% moisture by weight. The product so frozen may be packaged and preserved more or less indefinitely under refrigerated conditions of 0° F. or below.

The following examples are given to illustrate the broad principles of the present invention.

In preparing an illustrative batter 26.5 kilograms of water was placed in the bowl of a conventional mixing device and 113.4 grams of baking soda, 170 grams of powdered caramel color and 7.5 grams of "92% Uni-dried Burnt Sugar Shade" (U.S. Certified Color) were added and mixed with the water. Approximately 11.5 kilograms of sifted unbleached soft wheat pastry flour was then added slowly to the foregoing mixture and mixed therewith. 641 grams of vegetable oil was then added. Thereafter an additional amount of the flour (sufficient to establish a ratio in the mixture of 200 parts by weight of flour to 1 part by weight of baking soda) was slowly added and mixed into the batter thus formed. The consistency of this batter was adjusted, by the addition of such water as was required to give a reading of about 65 on an F.M.C. consistometer (as measured with the "A" paddle).

In preparing an illustrative shell a measured amount of the batter having the consistency as described above is placed, preferably by metered injection, into a suitably shaped and dimensioned mold. The mold was in this instance made of thick cast aluminum and comprised a concave member and matching convex member, so shaped as to produce a shell simulating the skin of half of a baked potato which has been split along its major axis. A representative shell produced in the cavity of such a mold is about 10 cm. long, about 5 cm. wide, about 1.5 mm. thick and provides a cavity about 2.5 cm. deep (it being understood that the foregoing dimensions are averages and not necessarily precise, since the mold and the shell which it forms simulates the skin of an irregularly shaped potato).

The mold, preferably preheated to a temperature close to the baking temperature of the batter, is quickly closed after the batter is placed in the mold and desirably it is closed with sufficient pressure to cause the batter to completely fill the mold cavity and "flash" (to a limited degree) at the abutted mold surfaces. The batter-filled mold is then heated over an open gas flame in order to bake the batter. This baking was maintained for about 2 minutes at a temperature maintained between 280° F. and 300° F. as measured by a thermocouple at the mold surface. The molded baked shells were then discharged from the molds and had a moisture content of from about 2% to about 10% by weight.

It is to be understood that the times and temperatures of baking the shell have been found suitable for such mold structure and dimensions, and that other baking apparatus may be used. A cooked shell with dimensions as mentioned above made from batter of the proportions of ingredients and consistency described above will have a weight from about 4 to about 6 grams, with a moisture content of between about 5% and 10%. The apparent density of the shells was between about 0.35 and 0.40 gram per cc.

The baked pastry shells, prepared as described above, may be packaged, preferably in sealed containers, and shipped as articles of commerce. Alternatively, the baked pastry shells may be filled with measured amounts of cooked mashed potatoes and thereafter processed, to produce a frozen edible product, in the following illustrative manner.

Suitable peeled, freshly-cooked and mashed potatoes were blended with non-fat dry milk, water if necessary, salt, pepper and butter to taste, to produce a hot, mashed potato formulation having a moisture content of about 78% by weight and a temperature of about 125° F. About 115 grams of this mashed potato formulation was then placed within, so as to over-fill, the cavity of a molded baked pastry shell. The wall of the shell was about 1.5 mm. in thickness, and the shell was about 10 cm. long by 5 cm. wide by 2.5 cm. deep (average dimensions), weighed 5 grams, and had a moisture content of about 6.5% by weight.

After the mashed potato formulation was placed in the shell, as described above, the so-filled shell was permitted to stand or "age" at room temperature in air of about 35% relative humidity for eight minutes. The aged shell and its contents were then placed in a quick freeze chamber and held for 40 minutes at a temperature of −35° F.

In order to determine the moisture content of the shell at the instant of freezing, the frozen potato mash formulation was removed from the frozen product and the shell per se was analyzed for moisture. The analysis revealed an average moisture content of about 28% by weight. The shell did not crack upon freezing and upon reconstitution was palatable and the texture was somewhat tough, yet fragile enough to be readily cut with a knife or torn with a fork, resembling the natural skin of a baked potato. The frozen product prepared as described above may be packaged and shipped under refrigerated conditions as a frozen article of commerce.

To prepare the frozen product for serving it may be heated in an oven, at an oven temperature of from about 300° F. to about 425° F., for from about 30 minutes to about 50 minutes. Additional sauces and seasonings to taste may be added before or after thawing in the oven, after which the heating is continued.

In preparing the shells and the frozen product made by utilizing such shells there are certain ranges of proportions of materials and conditions which are utilizable with best results, and some which are critical. Thus, in preparing the batter for the shells it is an objective to provide a batter which on baking gives a shell which has a somewhat tough, moderately crisp texture such as is found in the skin of a baked whole potato. Many pastry batters yield a product which has an undesired porous texture—undesired in part because it leads to excessive absorption of moisture from mashed potato and provides a soggy product. In the batter of the present invention the weight ratio of flour to baking soda is critical within limits. The best product is produced where this ratio, by weight, is within the range of from about 160 to 240 (flour) to 1 (baking soda). Within this range a ratio of about 200 to 1 is preferred. A ratio of pastry flour to baking soda much in excess of 240 to 1 yields a shell having a cardboard-type texture, while a ratio of less than 160 to 1 yields a soggy product upon reconstitution.

While the batter may be mixed in any convenient machine and in any convenient manner, the consistency of the batter is critical within limits, and is related to the shell thickness desired as well as the shell molding and baking apparatus. In order to give proper molding in the shell baking apparatus described herein, and the required extent and nature of leavening, the consistency of the batter just prior to molding must be equivalent to a consistency within the range of from about 60 to about 70 as measured on an F.M.C. consistometer using an "A" paddle. Within this range a consistency equivalent to between about 64 to about 66 as so measured, is a preferred range. A less viscous batter (below 60) may yield a shell with blow holes and other surface imperfections while a more viscous batter (above 70) may not fill the molds uniformly or completely, which will lead to major surface imperfections.

The "F.M.C." consistometer utilized measures the resistance of the batter suspension to a member moving in relation thereto. The unit is manufactured by C. W. Brabender Instruments, Inc., South Hackensack, New Jersey, and comprises a turn-table having a vertical axis for rotating a cup or container for the suspension, a paddle which is immersed in the suspension, and means for supporting the paddle which includes a torque measuring device. The turn-table rotates at 78 r.p.m. The "A" paddle consists of a shaft and a thin rectangular sheet of stainless steel 2 inches high and 1½ inches wide for immersion in the fluent suspension. The torque scale is graduated in units from from 1 to 100 over a 270° segment of a circle. The total range of the torque which the scale covers corresponds to from 0 to 45 cm. grams. The standard cylindrical cup is 4½ inches high by 3 inches in diameter and is filled to the top, the paddle being completely immersed. A consistency of 60 corresponds to a torque of 27 cm. grams and a consistency of 70 corresponds to a torque of 31.5 cm. grams.

While the molds may be made of any desired material and of any desired shape, molds of aluminum and of a shape which produces a shell simulating the half skin of a baked potato are preferred. The size of the molded pastry shell as determined by its length, width and depth is not critical and may be varied but is preferably of such dimensions as may accommodate an average per person portion of mashed potato formulation, for example from about 100 grams to about 120 grams thereof. Continuity of the molded pastry shell wall or integument, that is to say, freedom from blow holes or other perforations in the shell wall or integument is a critical factor. The thickness of the walls of the molded pastry shell is also critical within limits and should be between about 0.5 mm. and about 5 mm. and preferably within the range of about 1.0 mm. and about 2.0 mm. Desirably the wall of the pastry shell should have minor variations in thickness since such variations simulate the irregularities and rough texture of natural potato skin.

The baking conditions to which the batter in the mold is subject may vary depending upon the particular molding apparatus which is employed. We have found that using the above mentioned gas heated, aluminum molds, the conditions are critical within limits. Thus, for shells from about 1 mm. to 2 mm. in thickness and using the relatively mild baking temperature range of from about 280° F. to about 300° F., the batter in the mold may be baked for from about 90 seconds to about 150 seconds, it being understood that at the baking temperatures mentioned just above, smaller shells and shells with relatively thinner wals will be baked for shorter times within the baking time range. Upon release from the mold the baked shell should have a moisture content of between about 2% to about 15%, and preferably from about 5% to about 10% each by weight, an apparent density between about 0.20 and about 0.40 gram per cc.

The batter formulation and baking procedures are adapted to provide attractive gustatory properties in the product, and the apparent density of the shells is an important factor as regards such properties. A series of density evaluations were made by rapidly immersing a series of baked shells in water in a graduated cylinder and immediately reading the change in volume. Initially, the shells weighed between 3.6 and 5.9 grams and contained about 5 to 7% water by weight. The apparent density ranged from about 0.22 gram per cubic centimeter to 0.40 gram per cubic centimeter. Shells having apparent densities below about 0.20 gram per cubic centimeter and above about 0.50 gram per cubic centimeter provide inferior products when filled with mashed potatoes and processed as disclosed herein. The macrostructure of the baked shell of the invention is such that a relatively thin, continuous, and imperforate integument encloses a thicker, foam-like layer of appreciable porosity.

The physical characteristics of the baked shell are determined by the batter composition and its viscosity or consistency, by the molding procedure and by the baking procedure. The texture, density and weight, particularly, and to a certain extent the color of the shell, will be detrimentally affected if the mixing, molding and baking are performed substantially outside of the critical ranges described and illustrated herein, when using the described apparatus.

The shell, as produced above, may be packaged and sold as a separate article of commerce. Thus, it may be used as an edible serving container for locally prepared potato products, such as fresh mashed potatoes or reconstituted mashed, dehydrated potatoes. In military field operations, dehydrated potato granules or flakes which have been reconstituted and heated within such a shell, might prove to be a pleasant diet.

When the baked shell is not to be produced as a separate article of commerce, but is to be filled with a potato mash formulation and frozen it is desirable that the potato mash formulation have a moisture content of from about 73% to about 82% by weight, preferably about 78%. Since natural potatoes contain from about 18% to 26% solids, and some of the well known cooking processes, such as steam cooking, tend to partially dehydrate the potatoes, or additives such as milk solids may absorb moisture, it may be necessary to add water to the potato mash formulation in order to bring the moisture content within the desired limits. A shell with an average moisture content much below 20% will crack upon freezing since the shell is inelastic and will not expand sufficiently to accommodate the expansion of the potato product as it freezes. A shell with an average moisture over approximately 40%, upon reconstitution will have a mushy, soggy texture, unlike a bake potato skin. Since the shell, upon freezing, effectively ceases to absorb moisture, the moisture level must be adjusted to within the critical limits prior to the instant of freezing.

The molded pastry shell has four possible sources of moisture, namely: (1) moisture inherent to the controlled baking of this product (2% to 15% preferably 5% to 10% as mentioned above), (2) moisture absorbed from the air or surrounding atmosphere at any time during the process, (3) moisture absorbed from the potato mash formulation prior to the instant of freezing, and (4) moisture applied to the shell, such as from spraying the shell with a mist of water either before or after filling the shell, or both. Thus, it is apparent that the first three sources of moisture will donate to the shell an amount of moisture which will vary with the exact operational conditions (such as time from molding to filling, temperature of potato mash formulation at time of filling, and time from filling to freezing). However, the effect of these conditions may be readily determined.

The four moisture sources, as mentioned above, must be regulated to give a shell with a moisture content of from 20% to 40% at the instant of freezing, and may be regulated in any convenient manner.

Subjecting the shell to a fine mist of water may be desirable when the elapsed time between filling and freezing the product is small or when the shells prior to filling are relatively dry, that is they have a moisture content of about 3%.

The preferred method of adjusting the average moisture content is by aging the shell after filling and prior to freezing for a time sufficient to permit the shell to absorb, from the mashed potato formulation, sufficient moisture to bring its moisture content within the required limits. The aging time will vary depending upon the weight, moisture, and temperature of the mashed potato filling; the weight, thickness and moisture content of the shell; and the freezing conditions employed. It has been found that a 4 to 6 gram shell which is 1 to 2 mm. thick with a moisture content of 5 to 10%, filled with 110 to 130 grams of mashed potato of 22 to 24% solids content at 120° to 125° F., when aged for from about 5 to 12 minutes and subjected to sharp freezing at from about −20° to about −40° will yield a product, the shell of which will have a range of moisture of from about 20% to about 40% by weight. Such a product subjected to the above-mentioned conditions will freeze in from about 30 to about 50 minutes. The aging time would be shorter for a potato mash of more than 78% moisture, and a longer time would be required for less than 76% moisture in the mash. The higher the temperature of the mashed potato formulation, the faster the absorption of water by the shell from the mash. Cold mashed potatoes, at about 75° F. for instance, may be used. Normally, by the time hot cooked potatoes are mashed and placed in the shells, the temperature of the mash is below 135° F.

Although any convenient freezing method may be employed, a quick or sharp freezing, utilizing temperature from about −20° to −40° F. or colder, is preferred since quick frozen vegetables tend to retain more of their natural vegetable flavoring than vegetables processed by comparable technique employing slow freezing. A rapid freeze has the additional important advantage of quickly slowing and stopping the diffusion of moisture from the mashed potato filling to the shell. The actual freezing time required will vary with the size and latent heat of the product and the freezing conditions used. We have found that a 110 to 130 gram product at from about 90° F. to about 110° F. when subject to forced circulated air at −20° F. to −40° F. will freeze in from about 20 to about 50 minutes. Varying the size of the product from about 80 to 160 grams may cause the freezing time to vary from about 10 to 60 minutes when subjected to the same freezing conditions.

A 110 to 130 gram product, when subject to uncirculated air at 0° F. will freeze in from about 4 to about 6 hours. This, however, leads to excessive moisture diffusion from the potato product to the shell in most cases. An edible, moisture resistant coating on the interior of the shell may be used where excessive moisture absorption is a problem.

Once the product is frozen, it may be stored more or less indefinitely at temperatures below 0° F. Since the product is completely cooked before freezing, it is necessary only to thoroughly heat the product in order to prepare it for consumption. A product of 110 to 130 grams will completely heat in 45 minutes at a temperature of 300° F. or in 30 minutes at a temperature of 475° F.

The batter should also contain a fat or shortening, which may be solid at room temperature, such as lard or hydrogenated oil, although vegetable oil is preferred. The moisture content of the shell, immediately after baking, of about 2% to about 12%, is important as to the ease of removal of the shell from the forming mold. Fatty material in the batter helps prevent sticking of the shells to the mold, although if desired, the mold may have a "release" coating such as silicones, fat, or oil.

While it is believed that the baking of the batter may contribute to the desired brown color of the shell, additional coloring materials may be used where necessary to achieve a simulation of the color of a natural baked potato. Among such coloring material burnt sugar colorings are satisfactory.

Although not essential, potato materials may be included in the shell batter, for example to flavor the shell. Liquid extracted from frozen cooked or raw potatoes contains suitable flavoring ingredients, as does the material prepared from unpeeled potatoes by boiling until disintegration occurs, followed by comminution of the skin in the resulting mushy material. Such materials may be added in place of part of the aqueous liquid, such as water or milk, used in making the batter.

We claim:
1. A process for preparing a frozen food product which comprises forming a pastry batter, molding and baking said batter to form an edible shell, said shell having an average moisture content of from about 2% to about 15% by weight, spraying said shell with a quantity of water, said quantity of water being sufficient to raise the average moisture content of said shell to from about 20% to about 40% by weight, at least partially filling said shell with cooked mashed potato, and freezing said filled shell.

2. A process for preparing a frozen food product which comprises forming a pastry batter, molding and baking said batter to form an edible shell, said shell having an average moisture content of from about 2% to about 15% by weight, at least partially filling said shell with cooked mashed potato, holding said filled shell at ambient temperatures for a period of time sufficient to allow a quantity of moisture to diffuse from said potato to said shell, said quantity of moisture being sufficient to raise the average moisture content of said shell to from about 20% to about 40% by weight, and freezing said filled shell.

References Cited in the file of this patent

Encyclopedia Cookbook, published by Culinary Arts Institute, Chicago, 1948, pages 480, 481, 565, 597 and 598.